Patented Dec. 5, 1933

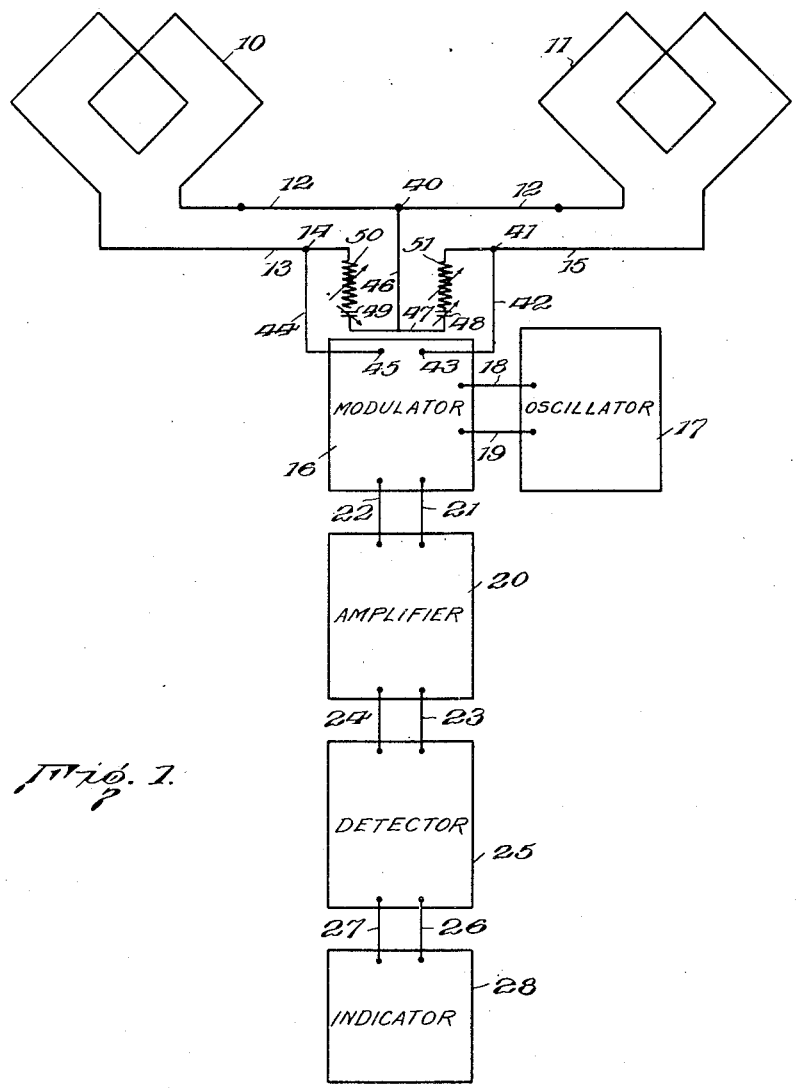

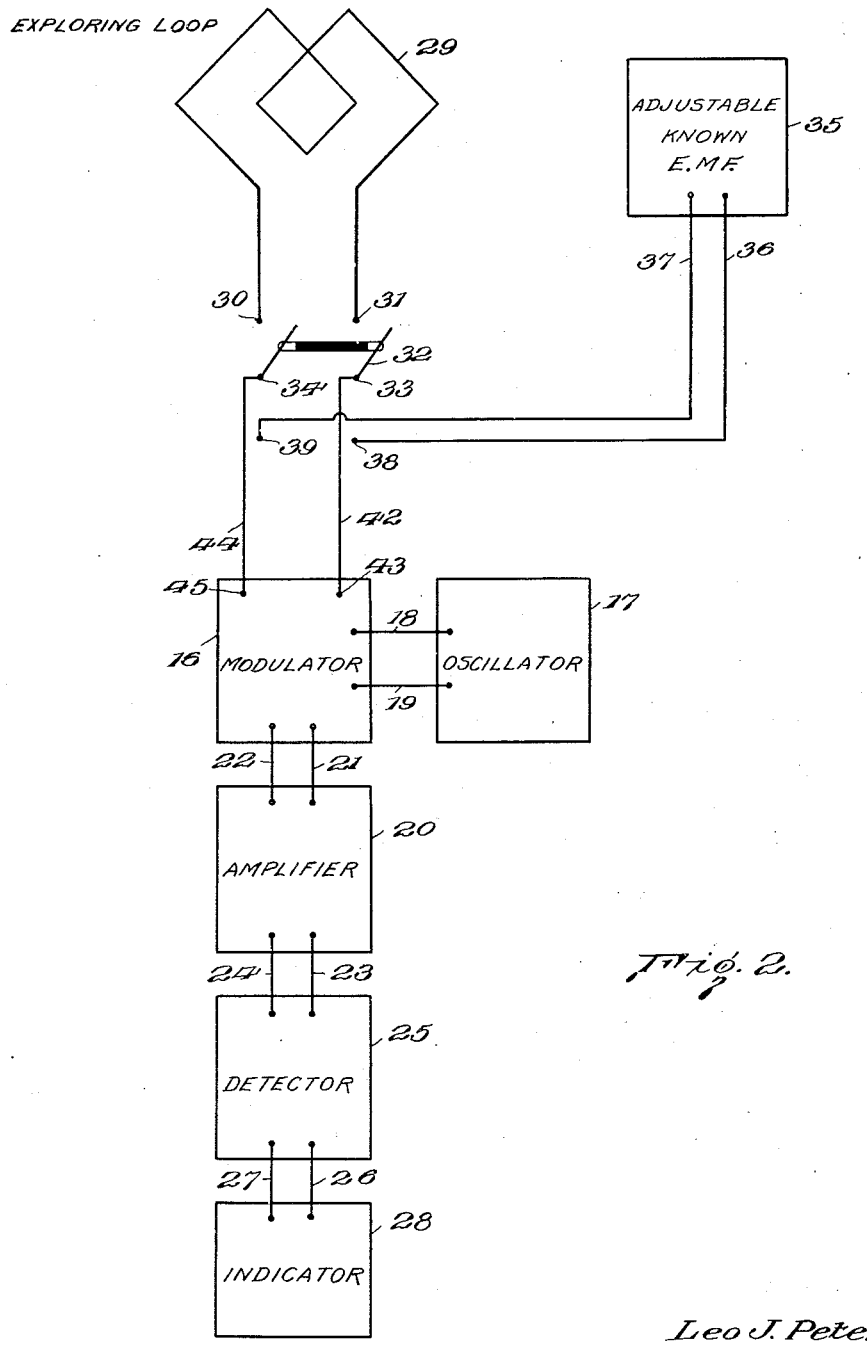

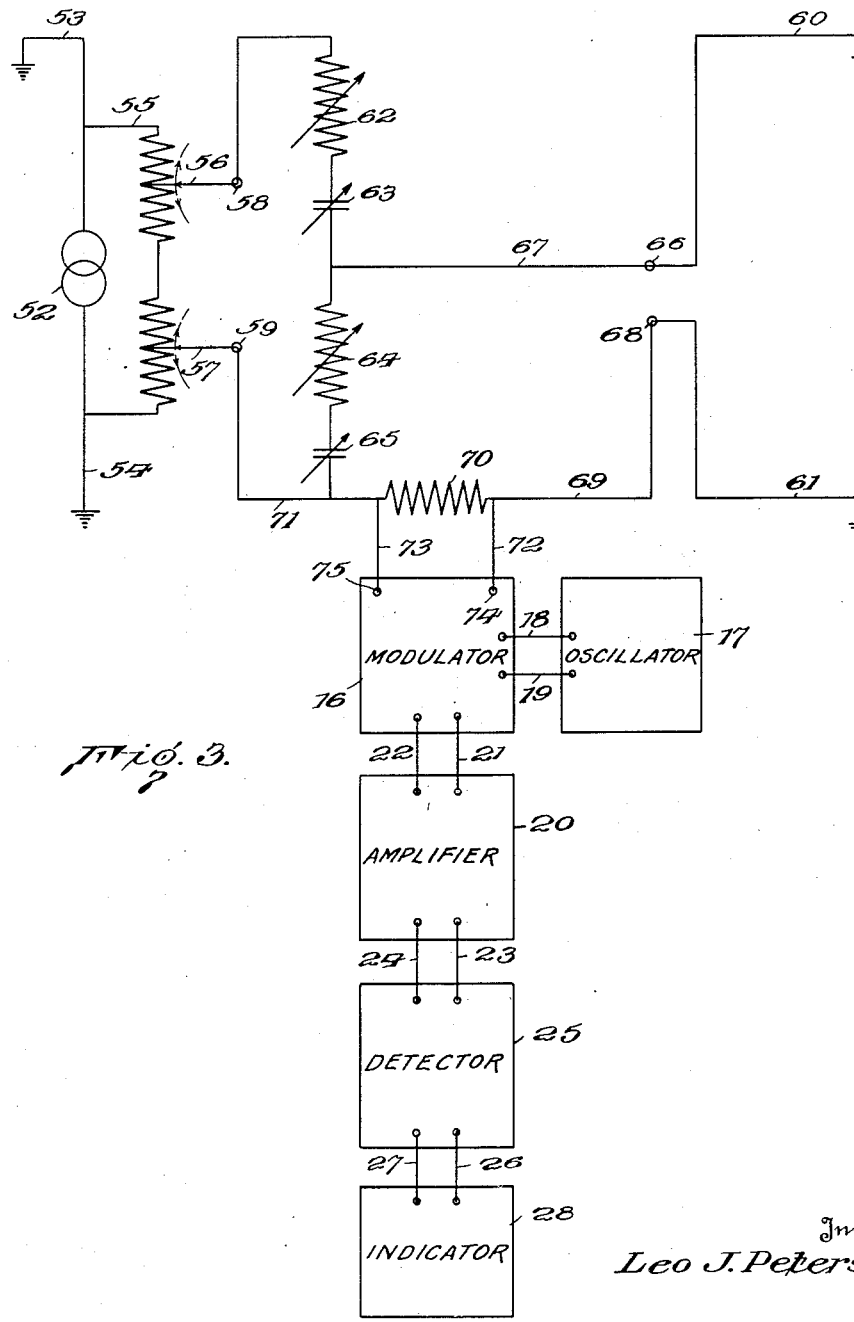

1,938,535

UNITED STATES PATENT OFFICE 1,938,535

METHOD OF AND APPARATUS FOR ELECTRICAL PROSPECTING

Leo J. Peters, Pittsburgh, Pa., assignor to Gulf Production Company, Houston, Tex., a corporation of Texas Application April 7, 1930. Serial No. 442,333

7 Claims. (Cl. 175—182)

My invention relates to improvements in the method of an apparatus for electrical prospecting.

In the art of electrical prospecting, it is customary to measure, study, and plot the distribution of an electromagnetic field or a potential field set up in the earth as a means for determining geological structures or the location of pockets of ore, oil or the like, the presence of which may distort the electromagnetic or potential field. In this art, it has been proposed to create in the earth a moderately high frequency (100 cycles or more) alternating electromagnetic or potential field, the distribution of which is to be studied as above indicated. It is known that, from some standpoints, a low frequency alternating current would have certain great advantages in electrical prospecting, inasmuch as the low frequency waves penetrate the earth better than those of higher frequency. Where an electromagnetic or potential field of moderately high frequency, that is, a frequency of more than 100 cycles per second, is employed, methods heretofore known will not give accurate data regarding geologic structure at a depth exceeding 1,500 feet, even under the most favorable conditions. As a rule, in determining the location of oil-bearing strata, it is imperative to secure data concerning geologic structure at a much greater depth since such strata are customarily found at depths exceeding 1,500 feet. Since low frequency waves penetrate the earth to far greater depth than waves of moderate or high frequency, the use of low frequency current is highly desirable in exploring deep strata. However, the currents or potentials to be measured or detected in studying the distribution of such an electromagnetic or potential field, are very weak and it is extremely difficult to measure or detect them with accuracy without amplification and, furthermore, to construct an amplifier which will amplify currents or potentials of low frequency so that they can be measured or detected accurately.

The principal object of my invention is to provide means by which an exploring current of low frequency may be used in electrical prospecting, and the feeble potentials or currents to be measured conveniently and easily amplified for subsequent measurement or detection.

My invention consists in impressing the low frequency currents or potentials to be measured or detected upon a carrier wave of higher frequency in a modulator, or equivalent device, by which currents or potentials of higher frequency are produced, certain of which are of an amplitude which is a function of the voltage of the low frequency current or potential only, which currents or potentials of higher frequency are amplified, detected and transmitted to a suitable indicating device. If desired, the amplifier or indicating device, or both, may be tuned so as to give a maximum response to certain of the higher frequency currents or potentials, and, if desired, a wave filter may be interposed between the detector and the indicating device, so as to select a current or potential of certain frequency to be transmitted to the indicating device.

In one instance, I accomplish the objects of my invention by the devices and means set forth in the following specification. My invention is clearly defined and pointed out in the appended claims. Apparatus constituting a preferred embodiment of my invention is illustrated diagrammatically in the accompanying drawings, forming a part of this specification, in which,—

Figure 1 is a diagrammatic representation of an apparatus embodying my invention as applied to the balance method of making measurements of a terrestrial electromagnetic field in electrical prospecting;

Fig. 2 is a diagrammatic representation of apparatus embodying my invention as applied to the comparison method of making measurements in electrical prospecting; and Fig. 3 is a diagrammatic representation of apparatus embodying my invention, as applied to the measurement of a terrestrial potential field.

In that branch of the art of electrical prospecting which involves the study of the distribution of a terrestrial electromagnetic field, it is customary to generate such field, for instance, by applying to the surface of the ground an extended loop, the terminals of which are connected to an oscillator or generator of alternating current. In accordance with my invention, I propose to use a low frequency exploring current for prospecting, for instance, a frequency of ten cycles per second.

According to the balance method of measurement, two coils or loops are used, one loop being so located that the phase and intensity of the potential induced therein is known, while, in the other loop, known as the exploring loop, the phase and intensity of the potential induced therein by the terrestrial electromagnetic field is unknown. These two loops are connected through a balancing device which includes suitable adjustable electrical circuit elements, such as resistance and capacity. These elements may be adjusted so that the potential across two suitably selected terminals of the balancing device shall be zero, and, when this condition exists, there is a known relation between the values of the circuit constants and the phase and magnitude of the known and unknown E. M. F.'s induced in the loops, thus permitting the phase and magnitude of the unknown E. M. F. to be determined. In accordance with this method of studying the terrestrial electromagnetic field, one of the loops is located at a point near the surface of the earth, where the phase, intensity and direction of the field is known, and the exploring loop is located at a distant point on the earth's surface, where the phase, intensity and direction of the field is to be determined, and the adjustable circuit elements of the balancing device are adjusted until the potential across the suitably selected balance terminals is zero, thus permitting a measurement of those quantities by which the intensity, phase and direction of the terrestrial electromagnetic field may be determined at the location of the exploring loop. When the field is of low frequency, it has been practically impossible, by means heretofore known, to secure an accurate determination of the balance point, due to the weakness of the currents or potentials and the difficulties of amplifying them.

In accordance with my invention, I propose to connect, across the balance terminals of the balancing device, a modulator which is also connected to an oscillator supplying a current of higher frequency, as, for instance, a frequency of two hundred cycles per second. The modulator is a device well known in the communications art and needs no further detailed description here. The output of the modulator will have various frequency components and, if $f'$ represents the frequency of the exploring and prospecting current and $f°$ the frequency of the current supplied by the oscillator, the principal frequencies of the modulator output will be $f°$, $f°+f'$, and $f°-f'$. The output of the modulator is connected to the input of an amplifier. This amplifier may be tuned so as to have a maximum response for the higher frequencies and is designed to amplify potentials of the principal frequencies appearing in the output of the modulator. It, thus, may have a frequency-amplification characteristic which is peaked for frequencies in the vicinity of $f°$. Thus, it is unnecessary to amplify potentials having the low frequency represented by $f'$ and the amplifier may be constructed so as to amplify at the desirable frequency, $f°$. Such an amplifier may readily be constructed for amplifying such higher frequencies, whereas it is extremely difficult to amplify the lower frequencies such as $f'$.

The output of the amplifier is connected to a detector such as is well known in the communications art, and the principal frequencies which appear in the output current of the amplifier are $f°$, $2f°$, $2(f°-f')$, $2(f°+f')$, $(2f°-f')$, $(2f°+f')$, $2f'$, $f'$. The frequencies $2(f°-f')$, $2(f°+f')$, and $2f'$ have amplitudes proportional to the square of the voltage of the input current to the modulator, while the frequencies $(2f°-f')$, $(2f°+f')$ and $f'$ have amplitudes proportional to the product of the voltage of the modulator input current and the voltage of the oscillator. It is the currents having frequencies truly proportional to the modulating current with which I am particularly concerned, and preferably these or one of these currents are transmitted to the indicating device to the exclusion of the others, thus yielding for observation, indications faithfully representative of the low frequency earth-derived or modulating current.

I propose to connect to the output of the detector and indicating device, which may be tuned so as to respond to currents whose amplitudes are functions of the voltage of the modulator input current only and to be relatively insensitive to other currents. Such tuned indicating devices are well known in the electrical engineering art and need no further detailed description here. I contemplate the use, as an indicating device, of a galvanometer, an oscillograph, a thermo-couple and meter, or a vacuum tube volt meter, and, if a tuned indicating device is to be used, I suggest the use of a tuned galvanometer or a tuned oscillograph. If desired, a wave filter may be interposed between the amplifier and the indicating device for the purpose of eliminating from the current transmitted to the indicating device, all frequencies except one having amplitude which is a function of the voltage of the modulator input current only and for which the indicating device may be tuned so as to give maximum response.

Referring to Fig. 1 of the accompanying drawings, I have illustrated therein diagrammatically, apparatus embodying my invention as applied to the balance system of making measurements in studying the intensity of a terrestrial electromagnetic field. The two loops 10 and 11 of the exploring circuit are connected to terminal 40 of the balancing device by the lead 12. The other end of loop 10 is connected by lead 13 to terminal 14 of the balancing device and, likewise, the other end of loop 11 is connected by lead 15 to the terminal 41 of the balancing device. The balancing device may include variable resistances 50 and 51, and variable capacities 48 and 49, the variable resistance 50 and the variable capacity 49 being connected in series between the terminal 14 and the lead 47 and, likewise, the variable resistance 51 and variable capacity 48 being connected in series between terminal 41 and lead 47. Lead 47 is connected with the terminal 40 by the conductor 46. These electrical circuit elements are adjustable and may be adjusted so as to balance the potential induced in loop 10 against the potential induced in loop 11, and, when this state of balance exists, the potential across the terminals 14 and 41 will be zero. Having adjusted the variable resistances and capacities until this condition of balance has been established, that is, until the potential across the terminals 14 and 41 is zero, the amount of resistance and capacity introduced into the circuits may be read from the usual dials or indicating devices and thereby the relation of the phase, magnitude and direction of the terrestrial electromagnetic field at the location of loop 11 may be determined from the known phase, magnitude and direction of the terrestrial electromagnetic field at the location of loop 10. In utilizing this scheme for measuring a terrestrial electromagnetic field, it is necessary to determine accurately the condition of zero potential across the terminals 14 and 41, and, to accomplish this, terminals 14 and 41 of the balancing device are connected by leads 44 and 42, as illustrated diagrammatically, to the input terminals 45 and 43 of the modulator 16. An oscillator 17 is connected to the modulator by the leads 18, 19. The output of the modulator is connected by leads 21, 22 to the input of an amplifier 20. The output of the amplifier 20 is connected by leads 23, 24 to the input of a detector 25 and the output of said detector is connected by leads 26, 27 to a suitable indicating device 28. As already stated, the amplifier 20 may be tuned, if desired, and that is likewise true of the indicating device 28, and, furthermore, if desired, a wave filter may be interposed between the detector 25 and the indicating device 28.

It will be understood that the balancing device which I have described, including the variable resistances and capacities connected between the terminals 14 and 41, is only one of several forms of balancing device or system which may be used in connection with this method of measuring a terrestrial electromagnetic field, the only essential feature being that a balancing device be used of such a nature that the electrical circuit elements thereof may be adjusted so as to cause the potential across two suitably selected terminals to be zero and that, when this condition exists, the intensity of the terrestrial electromagnetic field at the unknown location may be determined from the values of the electrical circuit elements, the known constants of the system and the intensity of the field at the location of the known loop. It will also be understood that current or potential may be induced in the loop 10, representing a known field intensity, by direct induction from a coil or conductor connected with a source of alternating current, rather than from a terrestrial electromagnetic field, as in the example specifically illustrated and described above. In either case, the application of my invention will be the same, the principle being that of balancing induced potential of unknown value against a potential of known value.

Although, by way of example, I have suggested the use of an exploring frequency of ten cycles per second and a current frequency of two hundred cycles per second furnished by oscillator 17, my invention is not to be restricted or limited to such specific frequencies, as I contemplate the use of any desirable exploring frequency and the use of any carrier frequency within the range of from ten to ten thousand cycles per second.

My invention is also applicable to the comparison method of making measurements in electromagnetic prospecting in which, as is well known, the amplitude of a current or potential induced in an exploring coil by the terrestrial electromagnetic field is compared with the known and adjustable amplitude of a source of current or potential of like frequency serving as a standard of comparison. In embodying my invention in this method of making measurements, I propose to provide, also, a modulator and an oscillator and to connect alternately and selectively the exploring loop and the adjustable source of current or potential of known amplitude with the input of the modulator. The output of the modulator is to be connected to an amplifier, the output of which is connected to a detector, and the output of the detector is connected to a suitable indicating device, as already explained in connection with the balance system of measurement. The amplifier may be tuned, if desired, and so may the indicating device, and a wave filter may be interposed between the detector and the indicating device.

Referring to Fig. 2, which illustrates, diagrammatically, an apparatus embodying my invention for taking measurements of a terrestrial electromagnetic field by the comparison method, an exploring loop 29 is connected to the switch terminals 30, 31. These terminals may be connected by a double throw switch 32 with the terminals 33, 34, which are connected by leads 42, 44, with the input terminals 43, 45 of the modulator 16. A source 35 of alternating current, of like frequency with that of the exploring loop 29, but of known and adjustable amplitude, is connected by leads 36, 37, with the terminals 38, 39, which may also be connected by the double throw switch 32 with terminals 33, 34. Thus, the exploring loop, and the source of current of like frequency and known and adjustable amplitude, may be connected selectively with the input of the modulator 16. The remainder of this circuit to the indicating device 28 need not be again described, since it is identical with that shown in Fig. 1 and used in connection with the balance system of measurement, comprising the oscillator 17, amplifier 20, which may be tuned if desired, the detector 25, and the indicating device 28, which may also be tuned if desired. In this case, also, a wave filter may be interposed between the detector and the indicating device.

It will be seen, then, that either the known adjustable voltage 35, or the unknown voltage represented by the exploring loop 29, may be connected to the amplifying, detecting and indicating apparatus and, by reversing the position of the switch 32, the known quantity may be compared with the unknown, and the known quantity adjusted until the indicating device shows that it is identical with the unknown quantity represented by the exploring loop 29, thus determining the voltage of the current induced in the exploring loop 29 by the terrestrial electromagnetic field, and indicating the intensity and direction of said field in accordance with well known methods.

My invention is also applicable to that branch of the art of electrical prospecting in which the distribution of electrical potential in the earth, with reference to a source of potential, is studied in order to determine geological structure or the location of deposits of ore, oil, and the like. According to this method of electrical prospecting, electrodes connected with a source of alternating current are inserted in the earth. The source of alternating current, to which said electrodes are directly connected, also serves as a source of potential of known magnitude. A pair of exploring electrodes are inserted in the earth at the location at which the distribution of potential from the source of current is to be studied, said exploring electrodes being connected with the source of potential of known magnitude by a balancing device including adjustable electrical circuit elements which may be adjusted until the potential across a pair of suitably connected terminals is zero. When that condition has been established, the values of the adjustable electrical circuit elements having been ascertained by reading the instruments, and the magnitude of the source of potential being known, the difference of potential between the exploring electrodes may be determined, thus determining the distribution of potential in the earth with reference to the source of alternating current. Here, also, it is desirable to use, as the source of potential, alternating current of low frequency, for instance, ten cycles per second, and it is important to determine the condition of balance, that is, the condition of zero potential across the suitably selected terminals of the balancing device, with accuracy, and, to that end, I propose to connect said terminals to the input of a modulator to which an oscillator is connected, as in the apparatus already described, and to connect the output of said modulator with an amplifier and the output of said amplifier to a detector, the output of which is in turn connected with a suitable signaling or indicating device, thus translating the potential of low frequency, across the balanced terminals of the balancing device, to a potential of higher frequency and proportional amplitude which may be easily amplified and detected and indicated by conventional amplifying, detecting, and indicating apparatus.

Referring now to Fig. 3, which illustrates, diagrammatically, one embodiment of my invention as applied to the determination of the balance point, or condition of zero potential, in connection with the study of the distribution of potential or electrical intensity on the surface of the earth, by means of exploring electrodes, a source of alternating current 52, preferably of low frequency, such as ten cycles per second, has its terminals connected to the electrodes 53, 54, which are inserted in the surface of the earth. A potentiometer 55 is connected across the terminals of the source 52 of alternating current, this potentiometer thus constituting a source of electric potential of known and variable magnitude. Terminals 58, 59 of the balancing device are connected by leads 56, 57 adjustably to the resistance element of the potentiometer. At the location where the terrestrial potential or electrical intensity is to be studied, two exploring electrodes 60 and 61 are inserted in the surface of the earth. The exploring electrode 60 is connected to a terminal 66 of the balancing device, while the exploring electrode 61 is connected to the terminal 68 of said device. The terminal 58 of the balancing device is connected to one end of a variable resistance 62, the opposite end of which is connected to a variable capacity 63, the opposite side of which is connected to one end of another variable resistance 64. The opposite end of the variable resistance 64 is connected to one side of another variable capacity 65, the opposite side of which is connected to a lead 71, connecting with the terminal 59. The terminal 66 of the balancing device, to which the exploring electrode 60 is connected, is connected by a lead 67 to the lead connecting the variable capacity 63 and the variable resistance 64. The terminal 68, to which the exploring electrode 61 is connected, is connected by a lead 69 to a resistance 70, the opposite end of which is connected to the lead 71 extending to the terminal 59. The balance terminals 74, 75 are connected across the resistance 70 by the leads 72, 73, and these balance terminals are so selected that, when the potential across said terminals is zero, this condition having been brought about by adjusting the resistances 62, 64 and capacities 63, 65, the difference in potential between the exploring electrodes 60 and 61 may be determined in magnitude and phase by reference to the known potential, having ascertained the values to which the resistances and capacities were adjusted in order to bring about a condition of balance, or zero potential, across the balance terminals 74, 75. In order to determine this condition of zero potential with accuracy, notwithstanding the use of low frequencies, the terminals 74, 75, are connected to the input of the modulator 16. The remainder of this circuit to the indicating device 28 need not be again described, since it is identical with that shown in Fig. 1 and used in connection with the balance system of measurement, comprising the oscillator 17, amplifier 20, which may be tuned if desired, the detector 25, and the indicating device 28 which may also be tuned if desired. In this case, also, a wave filter may be interposed between the detector and the indicating device.

Of course, it is to be understood that the balancing device illustrated in the accompanying diagram is merely illustrative of a number of different forms of device which may be used for this purpose, the object of the balancing device being to balance the unknown difference in potential against the known, and the condition of balance being determined by observation of the potential across the suitably selected balance terminals of the balancing device, the condition of balance being attained when the potential across such balance terminals becomes zero.

It will be seen from the foregoing description, that I have provided a method and apparatus which greatly facilitates the measurement of the intensity and distribution of the terrestrial electromagnetic or potential field and enables me to make use of a very low exploring frequency, which is translated into higher frequencies of proportional amplitude, which higher frequencies may be easily amplified before passing to a detector and indicating device. Certain broad features of the invention disclosed herein are disclosed and claimed in my companion application, Serial No. 442,332, filed of even date herewith, to which cross-reference is hereby made.

I am aware that the means illustrated herein may be changed considerably without departing from the spirit of my invention and, therefore, I claim my invention broadly, as indicated by the appended claims.

What is claimed is:

1. The method of electrically determining the character of geologic structure beneath the surface of the earth, which comprises generating an alternating exploring current having a frequency of less than 100 cycles per second, applying said exploring current to the earth in such manner as to set up therein a low frequency electric or electromagnetic field, deriving a low frequency current from the earth thus provided with said low frequency electric or electromagnetic field, translating said earth-derived low frequency current into current having a frequency greater than 100 cycles per second and an amplitude proportional to the amplitude of said earth-derived current, rectifying said current of higher frequency and proportional amplitude, and determining the character of said earth-derived low-frequency current by means comprising an indicating device activated by said higher frequency current after rectification.

2. The method of electrically determining the character of geologic structure beneath the surface of the earth, which comprises generating an alternating exploring current having a frequency of less than 100 cycles per second, applying said exploring current to the earth in such manner as to set up therein a low frequency electric or electromagnetic field, deriving a low frequency current from the earth thus provided with said low-frequency electric or electromagnetic field, translating said earth-derived low frequency current into current having a frequency greater than 100 cycles per second and an amplitude proportional to the amplitude of said earth-derived current, rectifying said higher frequency current of proportional amplitude, and determining the character of said earth-derived low frequency current by means comprising an indicating device activated by the rectified current of higher frequency and proportional amplitude.

3. The method of electrically determining the character of geologic structure beneath the surface of the earth, which comprises generating an alternating exploring current having a frequency of less than 100 cycles per second, applying said exploring current to the earth in such manner as to set up therein a low frequency electric or electromagnetic field, deriving a low frequency current from the earth thus provided with said low frequency electric or electromagnetic field, applying said earth-derived low frequency current of undetermined values in opposition to a similar low frequency current of known values, translating any current representing a lack of equivalency between said low frequency currents of known and unknown values into a current having a frequency greater than 100 cycles per second and an amplitude proportional to the amplitude of said current representing a lack of equivalency, amplifying said higher frequency current, rectifying said amplified higher frequency current, and determining the character of said earth-derived current by means including an indicating device activated by the rectified current and a variable impedance balancing unit.

4. In apparatus for electrically determining the character of geologic structure existing beneath the earth by the use of an alternating terrestrial field of low frequency of the order of 100 cycles per second or less, the combination of means for deriving low frequency current from the earth thus provided with a low frequency terrestrial field, a source of alternating current of relatively high frequency, a modulator connected with said low frequency current-deriving means and said source of relatively high frequency current and operative to provide a modulated current of relatively high frequency having an amplitude proportional to the amplitude of the earth-derived current, means for rectifying said modulated current, and indicating means activated by said rectified current for yielding indications characteristic of the earth-derived low-frequency current.

5. In apparatus for electrically determining the character of geologic structure existing beneath the earth by the use of an alternating terrestrial field of low frequency of the order of 100 cycles per second or less, the combination of means for deriving low frequency current from the earth thus provided with a low frequency terrestrial field, a source of alternating current of relatively high frequency, a modulator connected with said low frequency current-deriving means and said source of relatively high frequency current and operative to provide a modulated current of relatively high frequency having an amplitude proportional to the amplitude of the earth-derived current, means connected to the output of said modulator for increasing the amplitude of said modulated relatively high frequency current, means for rectifying the amplified modulated current, and indicating means actuated by the rectified modulated current for yielding indications characteristic of the earth-derived low-frequency current.

6. In apparatus for electrically determining the character of geologic structure existing beneath the earth by the use of an alternating terrestrial field of low frequency of the order of 100 cycles per second or less, the combination of means for deriving low frequency current from the earth thus provided with a low frequency terrestrial field, a source of alternating current of relatively high frequency, a modulator connected with said low frequency current-deriving means and said source of relatively high frequency current and operative to provide a modulated current of relatively high frequency having an amplitude proportional to the amplitude of the earth-derived current, means for rectifying the amplified modulated current, and indicating means activated solely by rectified currents which are proportional in amplitude to the amplitude of the modulating current for yielding indications characteristic of the earth-derived low-frequency current.

7. In apparatus for electrically determining the character of geologic structure existing beneath the surface of the earth by the use of an alternating terrestrial field of low frequency of the order of 100 cycles per second or less, the combination of a pair of low frequency circuits the characteristics of one of which are known or readily determinable and the characteristics of the other of which are variable in accordance with the character of underlying geologic structure, variable impedance balancing units associated with one or both of said circuits and by which said circuits may be adjusted to a state of electrical equivalency, and means associated with said circuits for indicating any lack of electrical equivalency therebetween, said means comprising means associated with said circuit for translating low frequency currents flowing therein or therebetween into currents of relatively high frequency and proportional amplitude, means for rectifying the translated relatively high frequency currents of proportional amplitude, and indicating means connected to the output of said rectifying means and responsive to rectified translated current of proportional amplitude.

LEO J. PETERS.